US012452772B2

(12) United States Patent
Vig et al.

(10) Patent No.: US 12,452,772 B2
(45) Date of Patent: Oct. 21, 2025

(54) OPTIMIZING DEVICE PROVISIONING PROTOCOL ONBOARDING TIME IN WIRELESS NETWORK

(71) Applicant: MediaTek Singapore Pte. Ltd., Singapore (SG)

(72) Inventors: Prakhar Vig, Uttar Pradesh (IN); Amit Shakya, Uttar Pradesh (IN); Milankumar Narottmabhai Tandel, Uttar Pradesh (IN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 410 days.

(21) Appl. No.: 18/052,290

(22) Filed: Nov. 3, 2022

(65) Prior Publication Data
US 2023/0164671 A1 May 25, 2023

(30) Foreign Application Priority Data

Nov. 24, 2021 (IN) .............................. 202121054218

(51) Int. Cl.
*H04W 4/00* (2018.01)
*H04W 48/10* (2009.01)
*H04W 48/16* (2009.01)
*H04W 84/12* (2009.01)
*H04W 88/08* (2009.01)

(52) U.S. Cl.
CPC ........... *H04W 48/10* (2013.01); *H04W 48/16* (2013.01); *H04W 84/12* (2013.01); *H04W 88/08* (2013.01)

(58) Field of Classification Search
CPC ............................. H04W 48/10; H04W 48/16
USPC ......................................................... 370/338
See application file for complete search history.

(56) References Cited

U.S. PATENT DOCUMENTS

2021/0219353 A1* 7/2021 Montemurro ......... H04W 76/10
2022/0201596 A1* 6/2022 Zhou ..................... H04W 48/16

* cited by examiner

*Primary Examiner* — Temica M Beamer
(74) *Attorney, Agent, or Firm* — McClure, Qualey & Rodack, LLP

(57) ABSTRACT

An apparatus is provided, which includes a communication device and a processor. The processor is coupled to the communication device and configured to perform operations including the following steps: scanning wireless channels supported by the device on which an access point is advertising a specific information element (IE), via the communication device; adding the scanned wireless channels with the specific information element to a channel list; starting a presence-announcement procedure by sending a first presence-announcement frame on a first scanned wireless channel in the channel list in response to the apparatus onboarding to a wireless network which includes a controller and one or more proxy agents; and stopping the presence-announcement procedure upon receipt of a valid authentication request frame from the controller or one of the proxy agents within a predetermined time after sending the presence-announcement frame.

20 Claims, 11 Drawing Sheets

OPTIMIZING DEVICE PROVISIONING PROTOCOL ONBOARDING TIME IN WIRELESS NETWORK

CROSS REFERENCE TO RELATED APPLICATIONS

This application claims the benefits of India Provisional Application No. 202121054218 filed on Nov. 24, 2021, the entirety of which is incorporated by reference herein.

BACKGROUND OF THE INVENTION

Field of the Invention

The present invention relates to wireless-network communications, and, in particular, to a device and a method for optimizing DPP (Device Provisioning Protocol) onboarding time in wireless networks.

Description of the Related Art

In the DPP adaption of multi-access point (MAP) release 3 (MAP-R3) specification, a small device is utilized to communicate information related to a unconfigured device, as an enrollee yet to be onboarded into a wireless network, to a controller of the wireless network. The controller typically chooses one of several configured agents in the wireless network to start sending a DPP authentication request to the enrollee and to wait for a DPP authentication response from the enrollee. If the chosen configured agent does not receive any DPP authentication response from the enrollee, the controller will choose another configured agent to start sending a DPP authentication request to the enrollee and to wait for a DPP authentication response from the enrollee.

In Sections 6.2.2 and 6.2.3 of the DPP v2.0 specification, the steps for generating a channel list by the enrollee which issues DPP Presence Announcement frames are defined. However, these steps may repeat for many times on the channels which are unlikely to be used, resulting in a high DPP connection time in some cases.

BRIEF SUMMARY OF THE INVENTION

An embodiment of the present invention provides an apparatus, which includes a communication device and a processor. The processor is coupled to the communication device and configured to perform operations comprising the following steps: scanning wireless channels supported by the device on which an access point is advertising a specific information element (IE), via the communication device; adding the scanned wireless channels with the specific information element to a channel list; starting a presence-announcement procedure by sending a first presence-announcement frame on a first scanned wireless channel in the channel list in response to the apparatus onboarding to a wireless network which comprises a controller and one or more proxy agents; and stopping the presence-announcement procedure upon receipt of a valid authentication request frame from the controller or one of the proxy agents within a predetermined time after sending the presence-announcement frame.

In some embodiments, the specific information element refers to CCE (Configurator Connectivity Element) IE. The wireless device is an access point.

In some embodiments, the processor is further configured to send a second presence-announcement frame on a second wireless channel of the scanned wireless channels in the channel list in response to the processor failing to receive the valid authentication request from the controller or one of the proxy agents within the predetermined time after sending the first presence-announcement frame.

In some embodiments, the scanned wireless channels with the specific information element include a third wireless channel and a fourth wireless channel, which are overlapping wireless channels, and the processor is further configured to add the third wireless channel to the channel list and exclude the fourth wireless channel from the channel list in a first iteration of the presence-announcement procedure.

In some embodiments, in response to the processor failing to receive a valid authentication request frame from the controller or one of the proxy agents in four cycles of the first iteration, the processor is further configured to update the channel list by removing the third wireless channel from the channel list and adding the fourth wireless channel in the channel list in a second iteration of the presence-announcement procedure, and start the second iteration using the updated channel list.

In some embodiments, the processor is further configured to determine the scanned wireless channels in the channel list for a first iteration of the presence-announcement procedure using one of an out-of-band discovery technique and an in-band discovery technique.

In some embodiments, in response to the processor failing to receive a valid authentication request frame from the controller or one of the proxy agents in four cycles of the first iteration, the processor is further configured to update the channel list for a second iteration of the presence-announcement procedure using the other of the out-of-band discovery technique and the in-band discovery technique.

In some embodiments, when the out-of-band discovery technique is used, the processor obtains information about Wi-Fi 6E channels from an RNR IE (Reduced Neighbor Report Information Element) of 2.4G and 5G beacons, and scans on 2.4G and 5G channels to build the channel list. When the in-band discovery technique is used, the processor scans on Wi-Fi 6E preferred scanning channels which are not found in the RNR IE to build the channel list.

Another embodiment of the present invention provides a method. The method includes the following steps: scanning, by a processor of an apparatus, wireless channels supported by an apparatus device on which an wireless device is advertising a specific information element (IE) via a communication device; adding, by the processor, the scanned wireless channels with the specific information element to a channel list; starting, by the processor, a presence announcement procedure by sending a first presence announcement frame on a first one of the scanned wireless channels in the channel list in response to the apparatus is onboarding to a wireless network which comprises a controller and one or more proxy agents; and stopping the presence announcement procedure upon receipt of a valid authentication request frame from the controller or one of the proxy agents within a predetermined time after sending the presence announcement frame.

Yet another embodiment of the present invention provides an apparatus, which includes a communication device and a processor. The processor is coupled to the communication device and configured to perform operations comprising the following steps: scanning wireless channels supported by the device on which a wireless device is advertising a specific information element (IE) via the communication device using one of an out-of-band discovery technique and an in-band discovery technique; adding the scanned wireless channels with the specific information element to a channel list; starting a first iteration of a presence-announcement procedure using the scanned wireless channels in the channel list for the first iteration in response to the apparatus onboarding to a wireless network which comprises a controller and one or more proxy agents; and starting a second iteration of the presence-announcement procedure using the scanned wireless channels in the channel list, which is updated using the other of the out-of-band discovery technique and the in-band discovery technique, in response to the processor fails to receive a valid presence request frame in four cycles of the first iteration.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Implementations in accordance with the present disclosure relate to various techniques, methods, schemes and/or solutions pertaining to optimization for DPP onboarding in wireless networks. According to the present disclosure, a number of possible solutions may be implemented separately or jointly. That is, although these possible solutions may be described below separately, two or more of these possible solutions may be implemented in one combination or another.

In the present disclosure, the terms "repeater" and "Wi-Fi repeater" refer to a Wi-Fi device with at least one station (STA) interface and at least one access point (AP) interface, with an IEEE 802.3-compliant bridge between the STA interface and the AP interface.

In the present disclosure, the term "DPP-based Wi-Fi repeater network" refers to a network formed by multiple Wi-Fi repeaters so that at least one of the Wi-Fi repeaters is capable of functioning as a DPP configurator.

In the present disclosure, the term "1905" refers to IEEE 1905.1 standard, which defines a network enabler for home networking supporting both wireless and wireline technologies.

In the present disclosure, the terms "configured agent" and "proxy agent" refer to a device that is onboarded in a wireless network (e.g., DPP-based Wi-Fi repeater network or MAP-R3 network) using a DPP mechanism.

In the present disclosure, the terms "unconfigured agent", "enrollee" and "enrollee agent" refer to a device that is not yet onboarded into the wireless network. A unconfigured device is capable of functioning as a responder.

Figure 1:
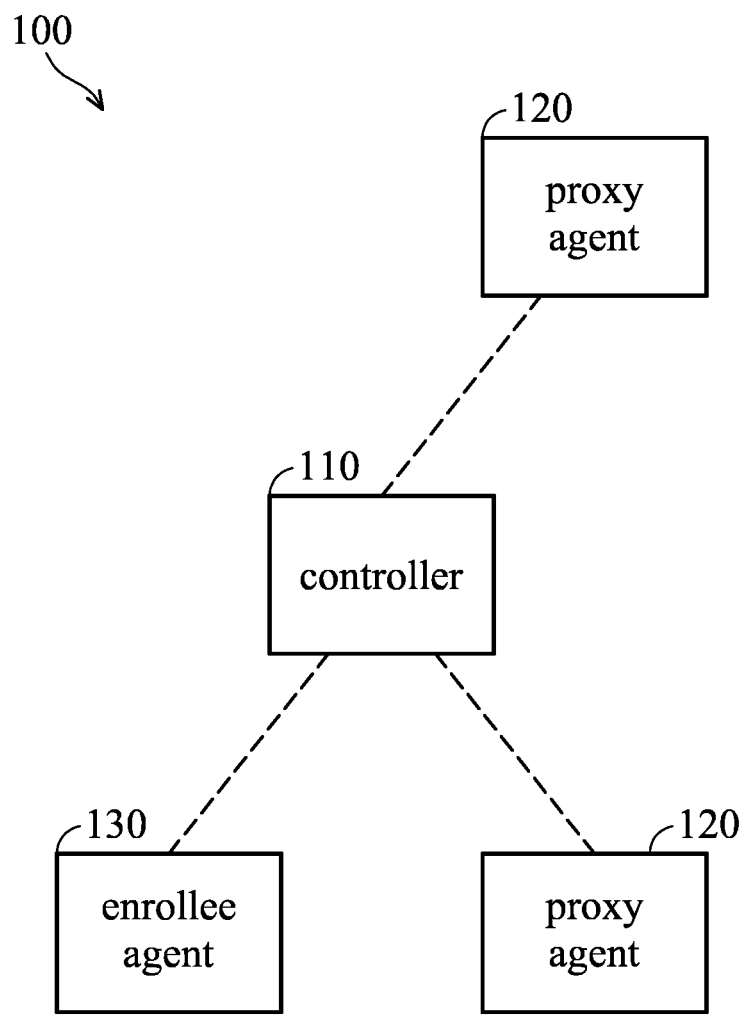
FIG. 1 illustrates a wireless network in accordance with an embodiment of the disclosure.

FIG. 1 illustrates a wireless network in accordance with an embodiment of the disclosure. The wireless network 100 (e.g., a MAP-R3 network) may include a controller 110, one or more proxy agents 120, and one or more enrollee agents 130. The controller 110 may be a central device which is capable of configuring other devices in the wireless network 100 using the DPP configuration protocol. The controller 110 will broadcast CCE (Configurator Connectivity Element) information element (IE) in its beacon and probe response to make its presence known to other agent devices in the wireless network 100. The CCE IE refers to an information element that is added into the beacon and probe response as a part to identify whether the controller 110 or agent device 120 supports the Wi-Fi Easy Connect R2 specification.

The proxy agents 120 may be part of the wireless network 100 controlled by the controller 110, and support AP (access point) and/or STA (station) functionalities. In addition, the proxy agents 120 may be devices which were previously on-boarded to the wireless network 100 (i.e., a MAP R3 network) using the controller 110 or other proxy agent 120. Upon onboarding or upon receiving a DPP URI, the controller 110 may inform each of the proxy agents 120 to enable the CCE IE in its beacon and probe response. In addition, in case that the controller 110 is not reachable directly to the enrollee device 130 or the controller 110 does not handle DPP action frames directly, the existing proxy agents 120 in the wireless network 100 may forward the messages from the enrollee agent to the controller 110 either through proxied or direct encapsulation (encap) 1905 messages.

The enrollee agent 130 will create a channel list and send a presence announcement action frame on the channels in the channel list, and will wait for at least 2 seconds for the response from the controller 110. The aforementioned channel list created by each agent device may include some default channels, such as channels 6, 44, and 149, other optional channels (if these channels are added in the URI (Uniform Resource Identifier)), and channels got through scanning the wireless network 100 for CCE IE.

Figure 2A:
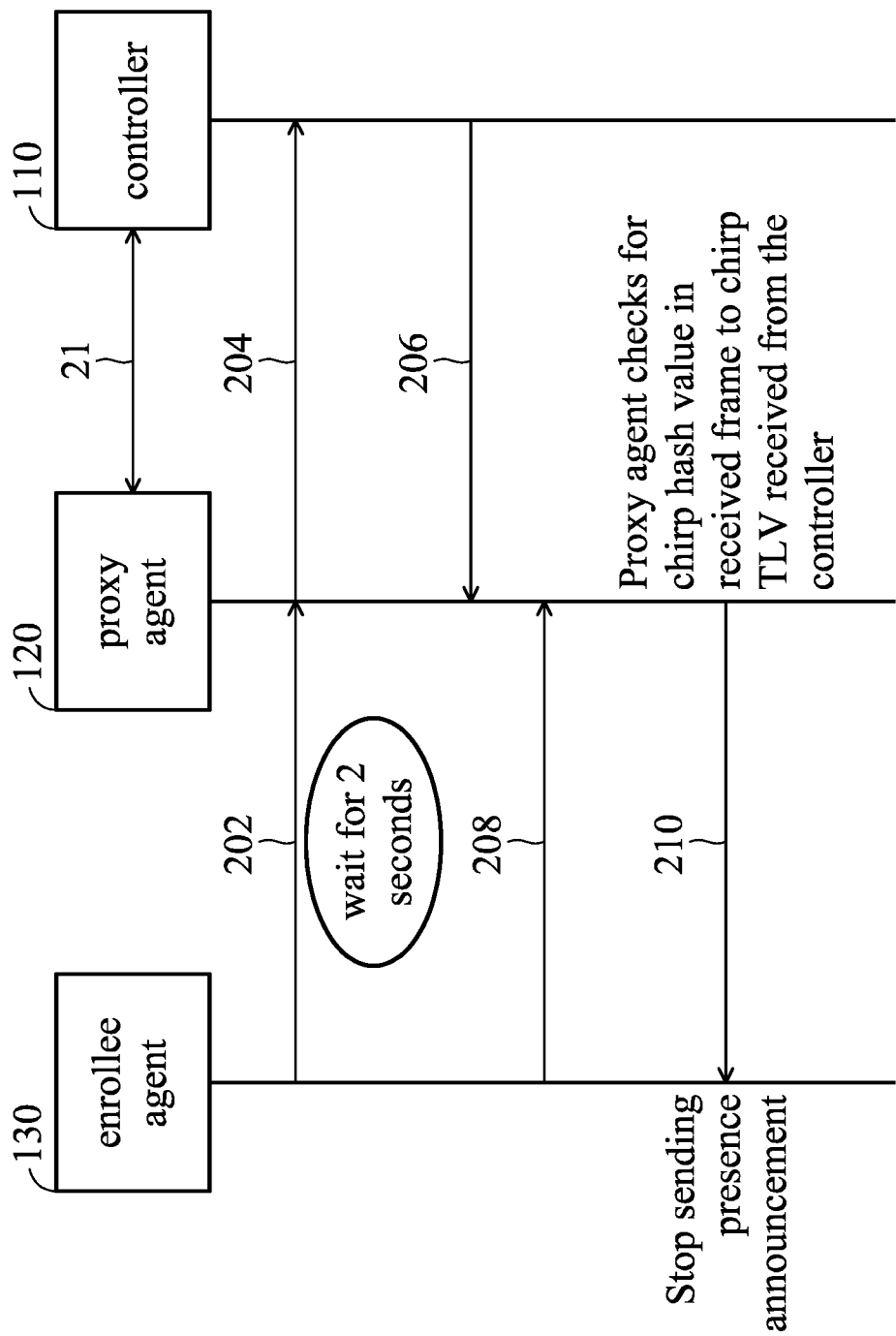
FIGS. 2A-2C are flow diagrams of the presence-announcement procedure in the wireless network in accordance with an embodiment of the present disclosure.
Figure 2B:
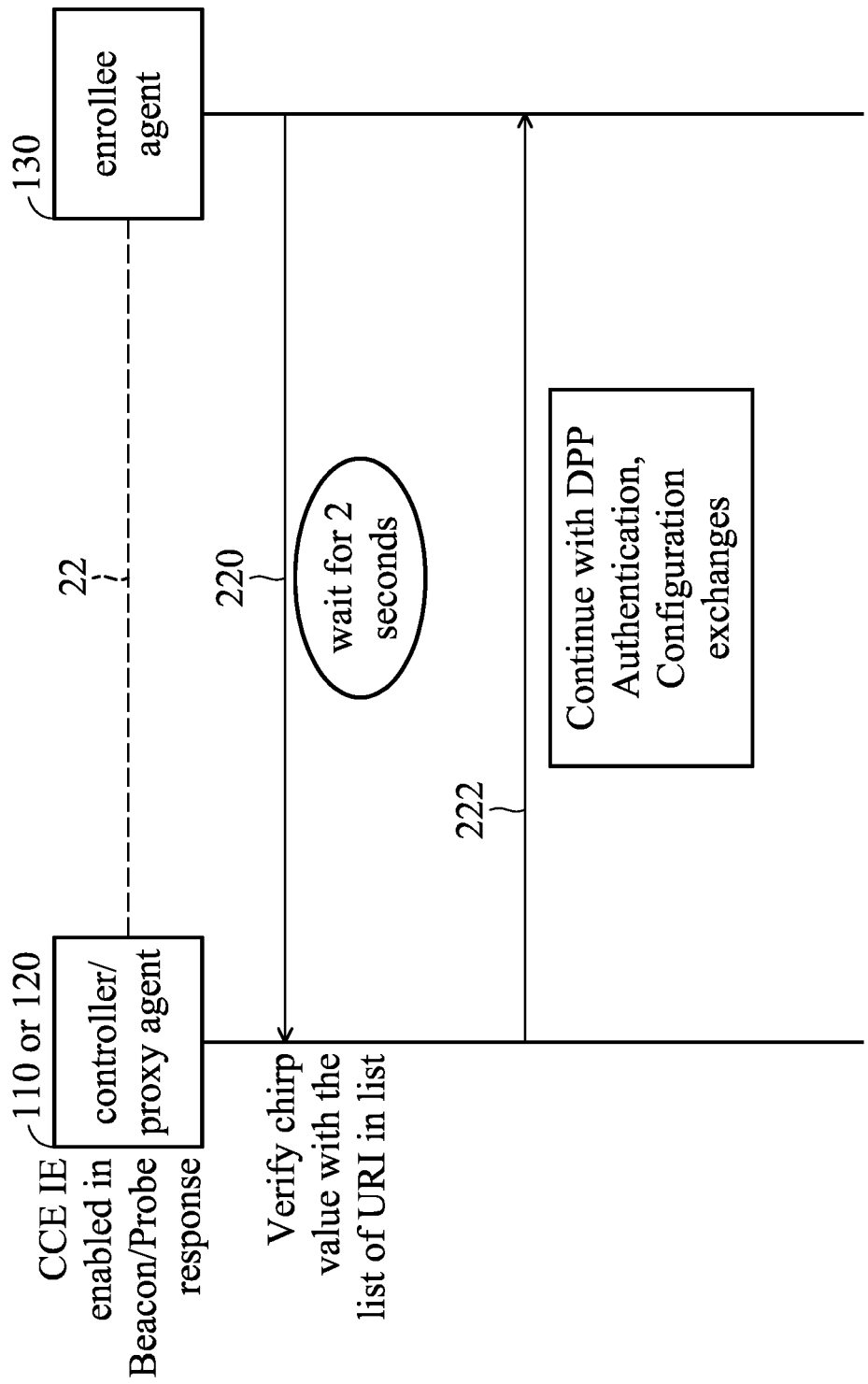
Figure 2C:
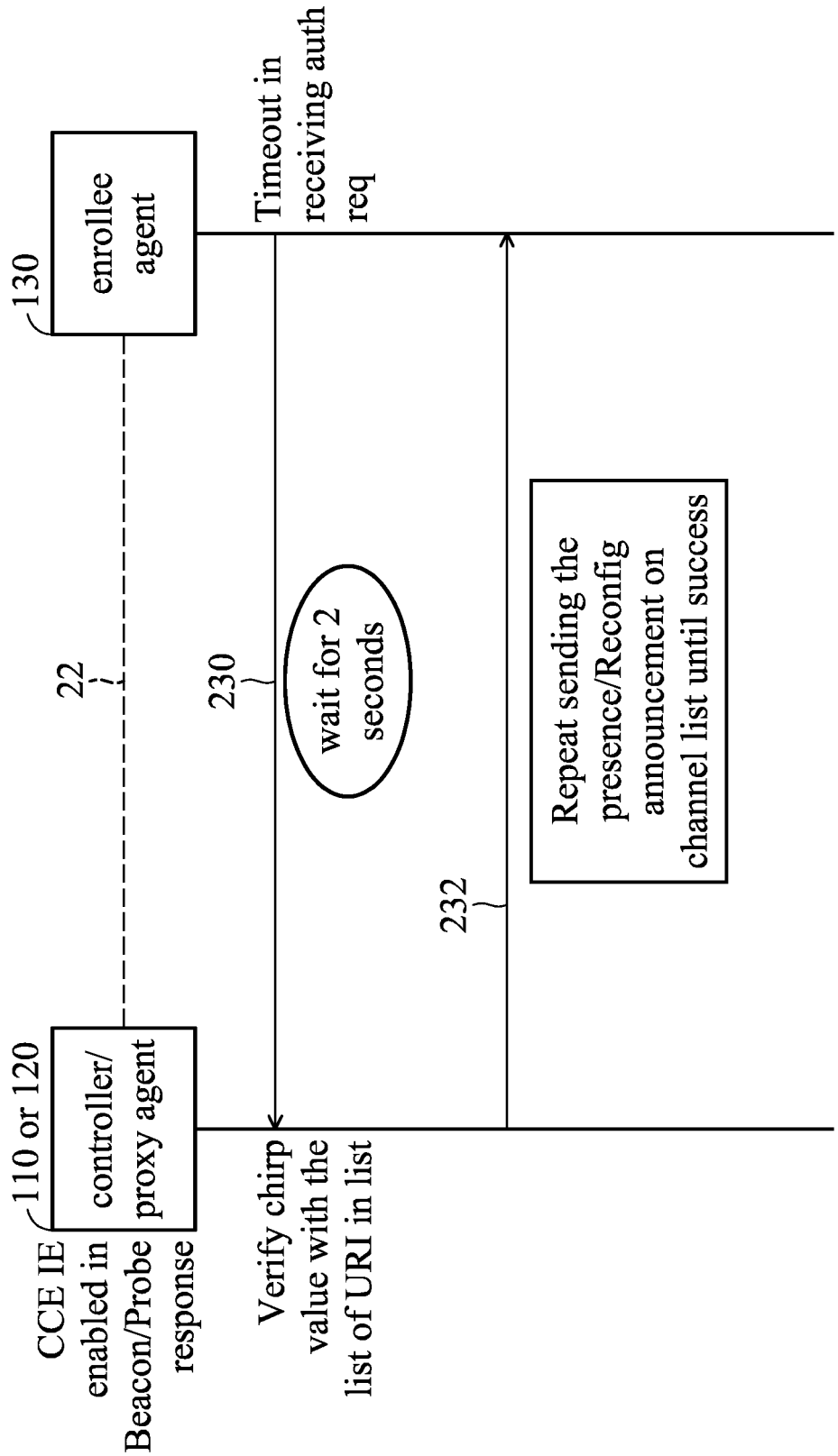

FIGS. 2A-2C are flow diagrams of the presence-announcement procedure in the wireless network in accordance with an embodiment of the present disclosure. Please refer to FIG. 1 and FIGS. 2A-2C.

An example of a presence-announcement procedure of the enrollee agent 130 is shown in FIG. 2A. For example, the controller 110 is connected to the proxy agent 120 through an Ethernet connection (e.g., a Wi-Fi link), and the proxy agent 120 is listening on channels 6 and 44. Upon the enrollee agent 130 onboarding the wireless network 100, the enrollee agent 130 starts advertising its presence by transmitting a periodic DPP Presence Announcement frame on various channels on its channel list. Each DPP Presence Announcement frame contains a bootstrapping key hash of the enrollee agent 130. For example, the enrollee agent 130 first issues a DPP Presence Announcement frame on channel 6 (step 202), which may be one of default channels (e.g., channels 6, 44, and 149) on the channel list.

Upon receiving the DPP Presence Announcement frame, the proxy agent 120 will encapsulate it in a 1905 chirp (i.e., Presence Announcement) notification message, and send the 1905 chirp notification message to the controller 110 (step 204). When the controller 110 has received the DPP Announcement frame of the enrollee agent 130 through one of the proxy agents 120, the controller 110 constructs a DPP Authentication Request frame, encapsulates it in a proxied 1905 encap DPP message with a DPP chirp value TLV (type-length-value), and sends the proxied 1905 encap DPP message to the proxy agents 120 (step 206) so that it may be relayed to the enrollee agent 130. It should be noted that the controller 110 also sends a hashed value (i.e., computed from the enrollee agent 130's public key in the DPP URI) that it expects in the DPP Presence Announcement frame of the enrollee agent 130.

If the enrollee agent 130 does not receive the DPP Authentication Request from the controller 110 or one of the proxy agents 120 within 2 seconds after sending the DPP Presence Announcement frame, the enrollee agent 130 will select the next channel (e.g., channel 44) on the channel list, and sends another DPP Presence Announcement frame on the next selected channel (step 208). For example, the duration between step 202 and 208 lasts for at least 2 seconds.

In addition, after step 208, the proxy agent checks whether the hash value in the received DPP Presence Announcement frame matches the hash value of the DPP chirp value TLV. If a match is found, the proxy agent 120 forwards the DPP Authentication Request to the sender (i.e., enrollee agent 130) of the DPP Presence Announcement frame. In this case, the DPP Presence Announcement frame and the DPP Authentication Request frame are sent on channel 6.

The enrollee agent 130 may continue the announcement procedure and listens for the DPP Authentication (Reconfiguration) Request frame. Upon receiving the DPP Authentication (Reconfiguration) Request frame, the enrollee agent 130 stops the announcement procedure, and engages in a DPP Authentication (Reconfiguration) exchange with the controller 110 through the proxy agent 120 on the channel of the proxy agent 120 from which it received the DPP Authentication (Reconfiguration) Request frame.

Problem 1: Long Overall Connection Time During Onboarding

In a scenario, the enrollee agent 130 needs to send the DPP Presence (Reconfiguration) Announcement frame on the channels in the channel list, which includes default channels (i.e., channels 6, 44, and 149), channels in the URI, and channels obtained during CCE scan. After sending the DPP Presence (Reconfiguration) Announcement frame on the currently selected channel, the enrollee agent 130 has to wait for at least 2 seconds before sending the DPP Presence (Reconfiguration) Announcement frame on the next selected channel.

If the enrollee agent 130 does not receive any response from the controller 110 or the proxy agent 120 as per the DPP specification, when all channels in the channel list of the enrollee agent 130 have been exhausted, the enrollee agent 130 has to pause for at least 30 seconds before repeating the announcement procedure as described above. The enrollee agent 130 may increase the wait time on the channels in the channel list each time the announcement procedure is repeated. Accordingly, the wait time per iteration will be increased by at least 6 seconds if the action frames are sent on the default channels (i.e., channels 6, 44, and 149), and it will increase the overall connection time of the DPP connection during onboarding.

FIG. 2B shows a success case of the presence-announcement procedure of the enrollee agent 130. For example, the controller 110 or the proxy agent 120 is connected to the enrollee agent 130 through a Wi-Fi link 22, and the CCE IE is enabled in the beacon and probe response of the controller 110 and proxy agent 120. When the enrollee agent 130 starts the presence-announcement procedure, the enrollee agent 130 sends a DPP Presence (Reconfiguration) Announcement frame to the controller 110 or proxy agent 120 (step 220). The controller 110 or proxy agent 120 will verify the chirp value with the list of the DPP URI. If proxy agent 120 determines that the hash value of the DPP Presence Announcement frame matches the hash value of the DPP chirp value TLV received from the controller 110, the proxy agent 120 sends the DPP Authentication Request frame to the enrollee agent 130 (step 222) within a predetermined duration (e.g., within 1 second) after receiving the DPP Presence (Reconfiguration) Announcement frame from the enrollee agent 130. Upon receiving the DPP Authentication Request frame that includes the key hash value of the enrollee agent 130, the enrollee agent 130 will stop the announcement procedure by responding with a DPP Authentication Response frame and ignoring any subsequent DPP Authentication frames it may receive from other proxy agents 120. Thus, the enrollee agent 130 may continue with the DPP authentication exchange with the controller 110 through the proxy agent 120 on the channel of the proxy agent 120 from which it received the DPP Authentication (Reconfiguration) Request frame. After successful completion of these frame exchanges, a secure channel between the controller 110 and enrollee agent 130 is established.

FIG. 2C shows a failure case of the presence-announcement procedure of the enrollee agent 130. The configuration of the controller 110, proxy agent 120, and enrollee agent 130 in FIG. 2C is similar to that in FIG. 2B. When the enrollee agent 130 starts the presence-announcement procedure, the enrollee agent 130 sends a DPP Presence (Reconfiguration) Announcement frame to the controller 110 or proxy agent 120 (step 230). The controller 110 or proxy agent 120 will verify the chirp value with the list of the DPP URI. If the proxy agent 120 determines that the hash value of the DPP Presence Announcement frame does not match the hash value of the DPP chirp value TLV received from the controller 110, the proxy agent 120 will not send the DPP Authentication Request frame to the enrollee agent 130. In some cases, if the proxy agent 120 does not receive the DPP Authentication Request from the controller 110 or it takes more time for the proxy agent 120 to get the DPP Authentication Request from the controller 110, the proxy agent 120 will not send the DPP Authentication Request frame to the enrollee agent 130, and the proxy agent 120 will reply to the enrollee agent 130 in next iteration. In some other cases, if the proxy agent 120 does not receive the DPP Presence Announcement frame or the DPP Presence Announcement frame is missed, the enrollee agent 130 will send the DPP Presence Announcement frame again in next iteration. As a result, if the enrollee agent 130 determines that no DPP Authentication Request frame is received from the controller 110 or proxy agent 120 within 2 seconds, the enrollee agent 130 determines that there is a timeout in receiving the DPP Authentication Request frame, and then sends another DPP Presence Announcement frame on other channel (step 232) which is selected from the channel list of the enrollee agent 130.

It should be noted that if the enrollee agent 130 cannot receive the DPP Authentication Request frame from the controller 110 or the proxy agent 120 in time (i.e., within 2 seconds after sending the DPP Presence Announcement frame), the enrollee agent 130 will repeat sending the DPP Presence Announcement frame on each of the remaining channels in the channel list until success. When all channels in the channel list of the enrollee agent 130 have been exhausted, the enrollee agent 130 has to pause for at least 30 seconds before repeating the announcement procedure.

As per the DPP specification, the enrollee that issues DPP Presence (Reconfiguration) Announcement frames shall derive a channel list on which to send these frames using the following steps:

Step 1: If the enrollee includes a list of global operating class/channel pairs in its DPP URI, add all those channels to the channel list excluding channels for which unsolicited transmissions are prohibited by local regulations (e.g., channels subject to Dynamic Frequency Selection).

Step 2: Select preferred Presence Announcement channels on which to send a DPP Presence Announcement frame to the broadcast address. For interoperability purposes, the preferred channel shall be one from each of the following bands, as supported by the Enrollee:
  2.4 GHz: Channel 6 (2.437 GHz);
  5 GHz: Channel 44 (5.220 GHz) if local regulations permit operation only in the 5.150-5.250 GHz band and Channel 149 (5.745 GHz) otherwise;
  60 GHz: Channel 2 (60.48 GHz);
In addition, the preferred Presence Announcement channels are added to the channel list by the enrollee agent 130.

Step 3: Scan all supported bands and add each channel on which an AP is advertising the Configurator Connectivity element (i.e., as described in Section 8.5.2 of the DPP specification) to the channel list.

Step 4: Remove any second or subsequent occurrence of duplicate channels in the channel list.
Solution to Problem 1

Figure 2D:
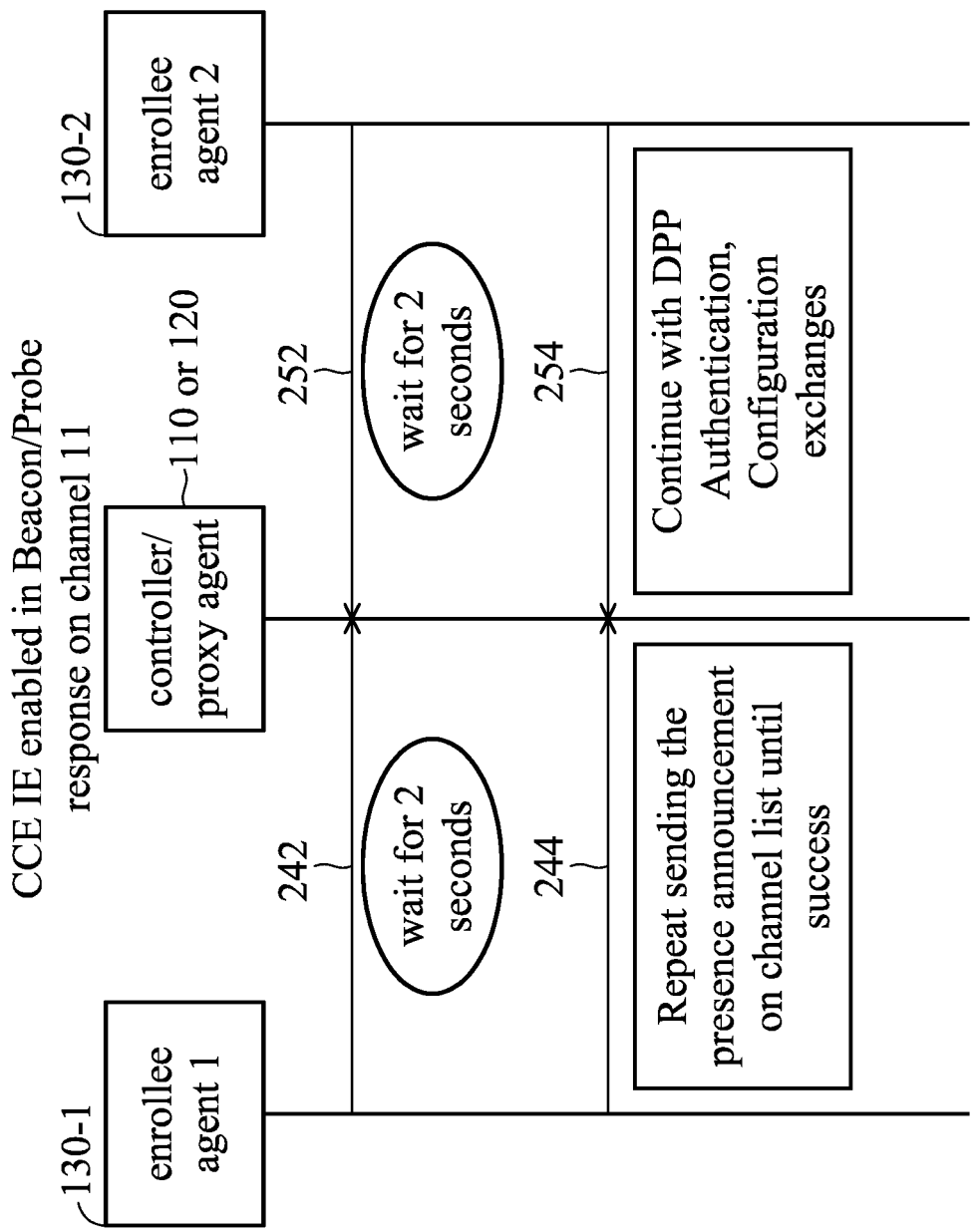
FIG. 2D is a flow diagram of the presence-announcement procedures of enrollee agents using different schemes building the channel lists in accordance with an embodiment of the present disclosure.

FIG. 2D is a flow diagram of the presence-announcement procedures of enrollee agents using different schemes building the channel lists in accordance with an embodiment of the present disclosure.

In an embodiment, in order to speed up DPP connection in multi-AP (MAP) network, the enrollee agent 130 skips steps 1 and 2, and includes only the channel from the scan result of the CCE IE in the channel list, and sends the DPP Presence (Reconfiguration) Announcement frame only on CCE IE found channels. Thus, the chirping procedure for the wireless network (i.e., MAP R3 network) can be optimized, thereby speeding up DPP connection in the wireless network 100.

In the scenario shown in FIG. 2D, the enrollee agent 130-1 follows steps defined in the DPP specification to form connection, and the enrollee agent 130-2 follows the proposed optimized algorithm as described above. In addition, it is assumed that the controller 110 or proxy agent 120 is CCE IE enabled in beacon and probe response on channel 11.

When the enrollee agent 130-1 starts its presence-announcement procedure, the enrollee agent 130-1 sends a DPP Presence (Reconfiguration) Announcement frame to the controller 110 or proxy agent 120 on channel 6 (step 242). For example, the enrollee agent 130-1 may build its channel list as per the DPP specification before starting its presence-announcement procedure, that is, the default channels (e.g., channels 6, 44, and 149) are included and prioritized in its channel list. In other words, channel 6 will be the first channel to be used, and channel 44 will be the second channel to be used, and channel 149 will be the third channel to be used, and so on.

Thus, the enrollee agent 130-1 will send the first DPP Presence (Reconfiguration) Announcement frame to the controller 110 or proxy agent on channel 6. If the enrollee agent 130-1 does not receive any DPP Authentication frame from the controller 110 or proxy agent 120 within a predetermined duration (i.e., 2 seconds) after sending the first DPP Presence (Reconfiguration) Announcement frame, the enrollee agent 130-1 will send the second DPP Presence (Reconfiguration) Announcement frame on the next channel (e.g., channel 44 for the second round) in the channel list (step 244). It should be noted that the enrollee agent 130-1 will repeat the presence-announcement procedure on each of the remaining channels in the channel list until success (i.e., receiving a matching DPP Authentication frame from the controller 110 or proxy agent 120 in 2 seconds).

When the enrollee agent 130-2 starts its presence-announcement procedure, the enrollee agent 130-2 sends a DPP Presence (Reconfiguration) Announcement frame to the controller 110 or proxy agent 120 on channel 11 (step 242). For example, the enrollee agent 130-2 may build its channel list following the proposed optimized algorithm, that is, the CCE IE channel advertised by the controller 110 or proxy agent 120, which is channel 11, is included and prioritized in its channel list. In other words, channel 11 will be the first channel to be used.

The controller 110 or proxy agent 120 will verify the chirp value with the list of the DPP URI. If proxy agent 120 determines that the hash value of the DPP Presence Announcement frame matches the hash value of the DPP chirp value TLV received from the controller 110, the proxy agent 120 sends the DPP Authentication Request frame to the enrollee agent 130 (step 254) within a predetermined duration (e.g., within 1 second) after receiving the DPP Presence (Reconfiguration) Announcement frame from the enrollee agent 130-2. Upon receiving the DPP Authentication Request frame that includes the key hash value of the enrollee agent 130, the enrollee agent 130-2 will stop the announcement procedure by responding with a DPP Authentication Response frame and ignoring any subsequent DPP Authentication frames it may receive from other proxy agents 120. Thus, the enrollee agent 130-2 may continue with the DPP authentication exchange with the controller 110 through the proxy agent 120 on the channel of the proxy agent 120 from which it received the DPP Authentication (Reconfiguration) Request frame. After successful completion of these frame exchanges, a secure channel between the controller 110 and enrollee agent 130-2 is established. Accordingly, the aforementioned embodiments in FIGS.

2A-2D may use a reduced presence-announcement channel list, and they would give more chance to make the DPP connection in the first attempt if the DPP Presence Announcement frame is sent on the wireless channel used by the controller 110 or proxy agent 120. If the DPP authentication request is not received on any channel, the proposed method can save at least 6-second connection time per iteration if the presence announcement frames are not sent on default channels.

Problem 2: Overlapping Channel Connection Issue

Prerequisite: In an overlapping-channel case, the proxy agent 120 or controller 110 will hear overlapping-channel packets of the enrollee agent 130, and the enrollee agent 130 will hear overlapping channel packets of the proxy agent 120 or controller 110.

Figure 3A:
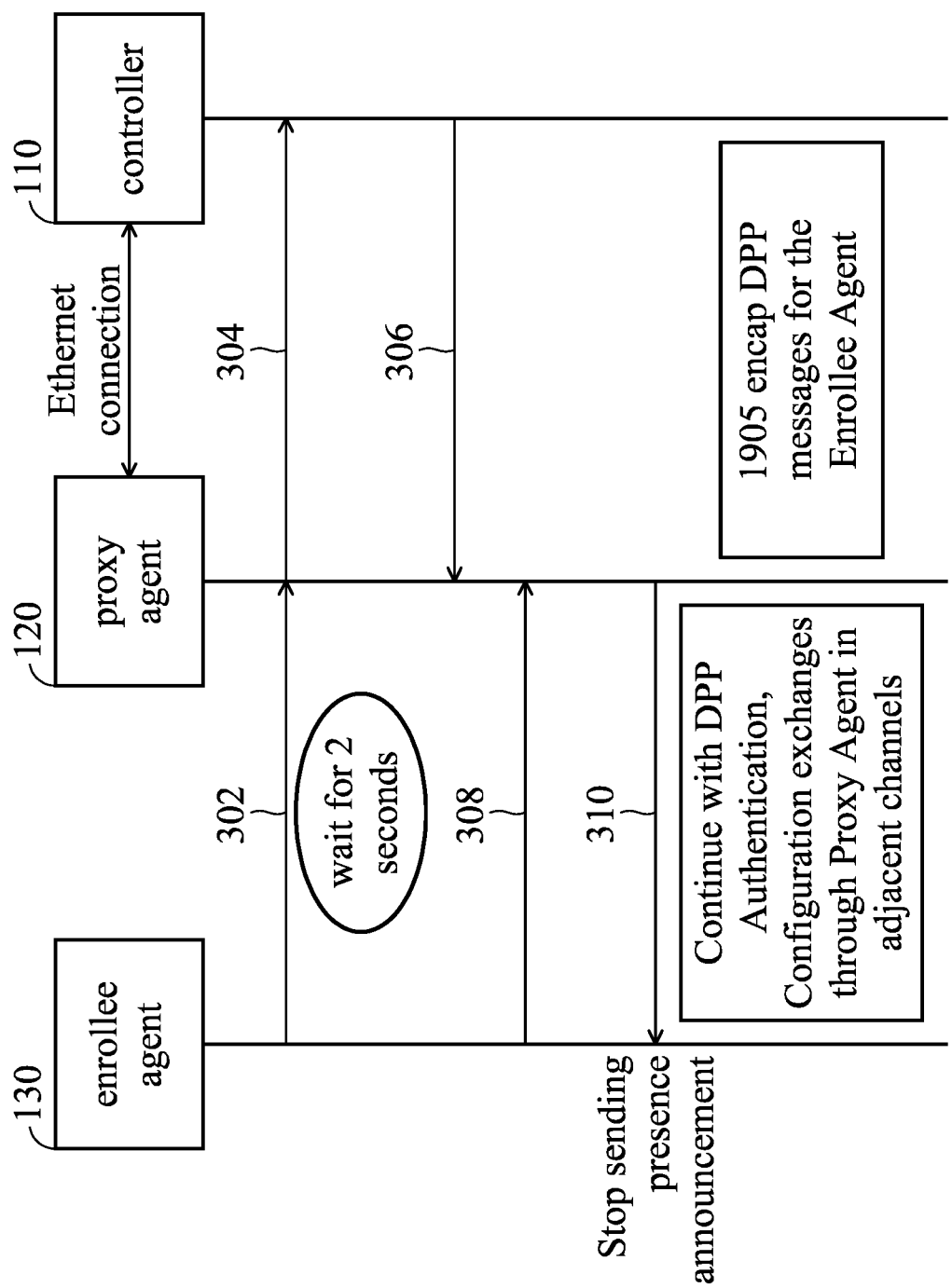
FIG. 3A is a flow diagram of a presence-announcement procedure of the enrollee agent in accordance with another embodiment of the present disclosure.

FIG. 3A is a flow diagram of a presence-announcement procedure of the enrollee agent in accordance with another embodiment of the present disclosure. Please refer to FIG. 1 and FIG. 3A.

Case 1: If the proxy agent 120 or controller 110 is working on an overlapping channel of one of the DPP default Presence channels used by the enrollee agent 130 in 2 GHz (e.g., the proxy agent 120 is working on channel 5), the enrollee agent 130 will hear CCE, and find that the proxy agent 120 is on channel 5. Then, the enrollee agent 130 will add channel 5 to its chirping channel list. In addition, as per the DPP specification, the enrollee agent 130 will add channel 6 to the chirping channel list as well because channel 6 is one of the default channels in the DPP specification. Thus, the enrollee agent 130 will start chirping on both overlapping channels: channel 5 and channel 6.

For example, as shown in FIG. 3A, the controller 110 is connected to the proxy agent 120 through an Ethernet connection, and the proxy agent 120 and controller 110 are listening on channel 5. When the enrollee agent 130 starts the presence-announcement procedure, the enrollee agent 130 sends a DPP Presence (Reconfiguration) Announcement frame to the proxy agent 120 on channel 5 (step 302). Upon receiving the DPP Announcement frame, the proxy agent 120 will encapsulate it in a 1905 chirp notification message, and send the 1905 chirp notification message to the controller 110 (step 304). When the controller 110 has received the DPP Announcement frame of the enrollee agent 130 through one of the proxy agents 120, the controller 110 constructs a DPP Authentication Request frame, encapsulates it in a proxied 1905 encap DPP message with a DPP chirp value TLV, and sends the proxied 1905 encap DPP message to the proxy agents 120 (step 306) so that it may be relayed to the enrollee agent 130.

If the enrollee agent 130 does not receive the DPP Authentication Request from the controller 110 or one of the proxy agents 120 within 2 seconds after sending the DPP Presence Announcement frame on channel 5, the enrollee agent 1300 will select the next channel, which is channel 6, on the channel list. The enrollee agent 1300 will then send another DPP Presence Announcement frame on the next selected channel (i.e., channel 6) (step 308).

Specifically, the proxy agent 120 receives the DPP Presence Announcement frame from the enrollee agent 130 on channel 5, and then receives a DPP Authentication Request frame from the controller 110 on channel 5 as a response. However, after receiving the DPP Authentication Request frame from the controller 110, the proxy agent 120 forwards the DPP Authentication Request frame to the enrollee agent 130 on channel 5 (step 310), but the enrollee agent 130 is on channel 6 in the next iteration (i.e., waiting on channel 6 for 2 seconds). However, due to the adjacent-channel issue, the proxy agent 120 may receive this DPP Presence Announcement frame on channel 5 even though the proxy agent 120 sends the DPP Presence Announcement frame to the proxy agent 120 on channel 6. Thus, the enrollee agent 130 will hear the DPP Authentication Request frame on the overlapping channel, which is channel 6.

As a result, the proxy agent 120 thinks that the enrollee agent 130 is on channel 5 due to the adjacent-channel issue, and the enrollee agent 130 thinks that the proxy agent 120 is on channel 6, so the enrollee agent 130 will start sending DPP Authentication/Configuration frames on channel 6, which is not correct, as both the proxy agent 120 and enrollee agent 130 are on different channels.

Figure 3B:
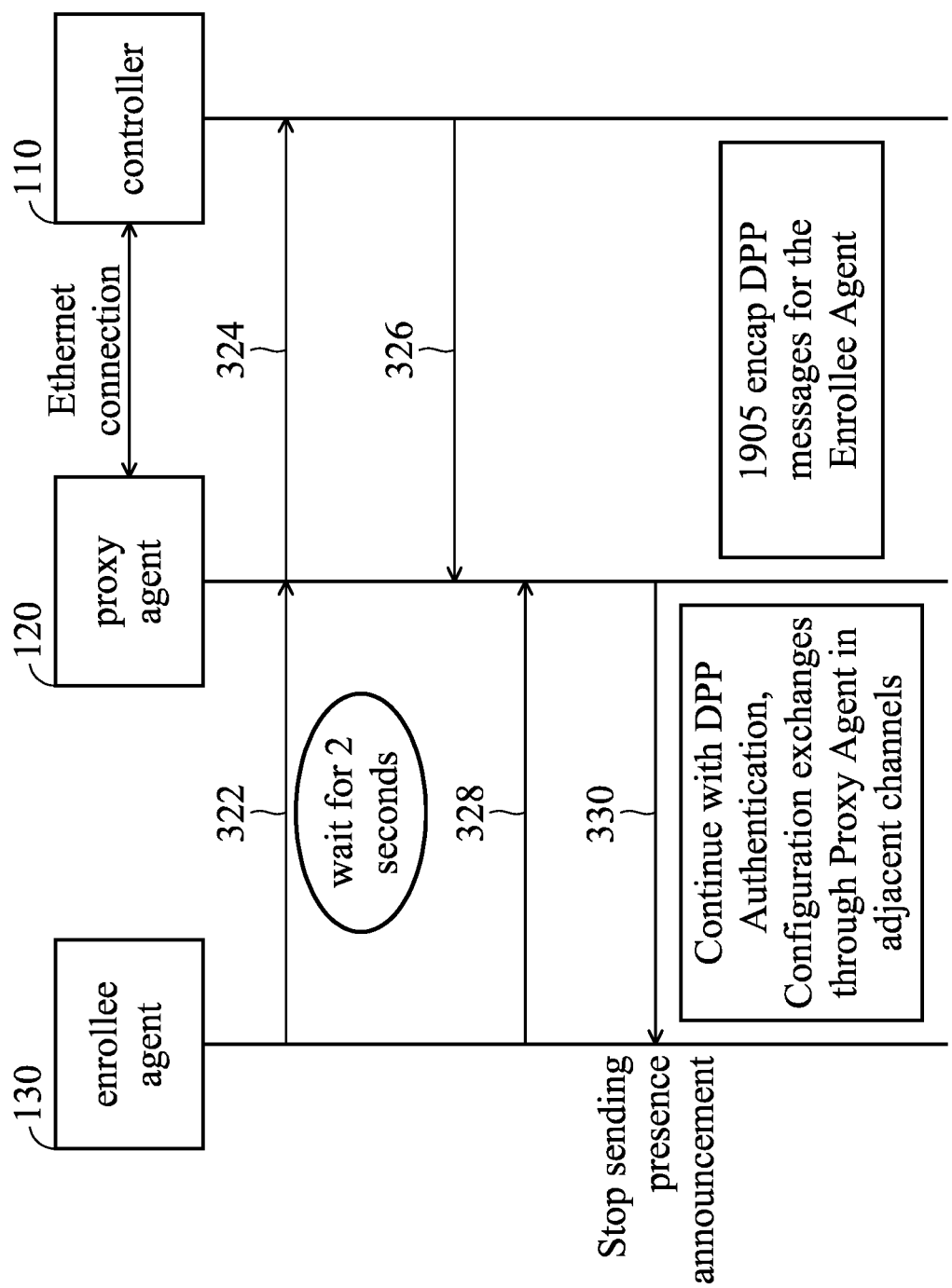
FIG. 3B is a flow diagram of a presence-announcement procedure of the enrollee agent in accordance with yet another embodiment of the present disclosure.

FIG. 3B is a flow diagram of a presence-announcement procedure of the enrollee agent in accordance with yet another embodiment of the present disclosure. Please refer to FIG. 1 and FIG. 3B.

Case 2: If the proxy agent 120 and the controller 110 are on adjacent 2.4G channels (e.g., channels 6 and 7), the enrollee agent 130 will hear CCE, and find the proxy agent 120 and controller 110 on channels 6 and 7. Then, the enrollee agent 130 adds channels 6 and 7 to its chirping channel list. Thus, the enrollee agent 130 will start chirping on channel 6 and channel 7 (which are overlapping channels).

For example, as shown in FIG. 3B, the controller 110 is connected to the proxy agent 120 through an Ethernet connection, and the proxy agent 120 and controller 110 are listening on channels 6 and 7, respectively. When the enrollee agent 130 starts the presence-announcement procedure, the enrollee agent 130 sends a DPP Presence (Reconfiguration) Announcement frame to the proxy agent 120 on channel 6 (step 322). Upon receiving the DPP Announcement frame, the proxy agent 120 will encapsulate it in a 1905 chirp notification message, and send the 1905 chirp notification message to the controller 110 (step 324). When the controller 110 has received the DPP Announcement frame of the enrollee agent 130 through one of the proxy agents 120, the controller 110 constructs a DPP Authentication Request frame, encapsulates it in a proxied 1905 encap DPP message with a DPP chirp value TLV, and sends the proxied 1905 encap DPP message to the proxy agents 120 (step 326) so that it may be relayed to the enrollee agent 130.

If the enrollee agent 130 does not receive the DPP Authentication Request from the controller 110 or one of the proxy agents 120 within 2 seconds after sending the DPP Presence Announcement frame on channel 6, the enrollee agent 130 will select the next channel, which is channel 7, on the channel list, and sends another DPP Presence Announcement frame on the next selected channel (i.e., channel 7) (step 328).

Specifically, the proxy agent 120 receives the DPP Presence Announcement frame from the enrollee agent 130 on channel 6, and then receives a DPP Authentication Request frame from the controller 110 on channel 7 as a response. However, after receiving the DPP Authentication Request frame from the controller 110, the proxy agent 120 forwards the DPP Authentication Request frame to the enrollee agent 130 on channel 6 (step 330), but the enrollee agent 130 is on channel 7 in the next iteration (i.e., waiting on channel 7 for 2 seconds). However, due to the adjacent-channel issue, the proxy agent 120 may receive this DPP Presence Announcement frame on channel 6 even though the proxy agent 120 sends the DPP Presence Announcement frame to the proxy agent 120 on channel 7. Thus, the proxy agent 120 receives the DPP Presence Announcement frame from the enrollee agent 130 on the overlapping channel (i.e., channel 6) even though the enrollee agent sends the DPP Presence Announcement frame to the proxy agent on channel 7. In addition, the enrollee agent 130 receives the DPP Authentication Request frame on the overlapping channel (i.e., channel 7) even though the proxy agent 120 sends the DPP Authentication Request frame to the enrollee agent 130 on channel 6.

As a result, the proxy agent 120 thinks that the enrollee agent 130 is on channel 6 due to the adjacent-channel issue, and the enrollee agent 130 thinks that the proxy agent 120 is on channel 7, so the enrollee agent 130 will start sending DPP Authentication/Configuration frames on channel 7 which is not correct as both the proxy agent 120 and enrollee agent 130 are on different channels.

As per Sections 6.2.3 of the DPP specification, the enrollee shall follow the procedure below for sending the Presence Announcement frames:

Step 1: For each channel in the channel list generated as per Section 6.2.2, the Enrollee, shall send a DPP Presence Announcement frame and listen for 2 seconds to receive a DPP Authentication Request frame. If a valid DPP Authentication Request frame is not received, it shall repeat the presence announcement for the next channel in the channel list.

Step 2: When all channels in the channel list have been exhausted, the Enrollee shall pause for at least 30 seconds before repeating the procedure in step 1 above. If the Enrollee's DPP URI includes a "channel-list" then the Enrollee should dwell on the channels from that list; otherwise, it should dwell on the preferred Presence Announcement channels as specified in Section 6.2.2. The Enrollee should increase the wait time on channels in the channel list each time the procedure in step 1 is repeated.

Step 3: If the device has cycled through the procedure (Steps 1 & 2) four times without receipt of a valid DPP Authentication Request frame, the Enrollee may wait some amount of time before resuming the procedure. Prior to resuming the presence-announcement procedure, however, it shall generate a new channel list using the steps specified in Section 6.2.2.

However, in Step 1 of the DPP specification, both the overlapping channels are added into the channel list, and thus the overlapping channels are sequentially used one by one in each and every cycle of the presence-announcement procedure, resulting in communicating in a wrong channel by the enrollee agent 130 and proxy agent 120.

Solution to Problem 2

Figure 4:
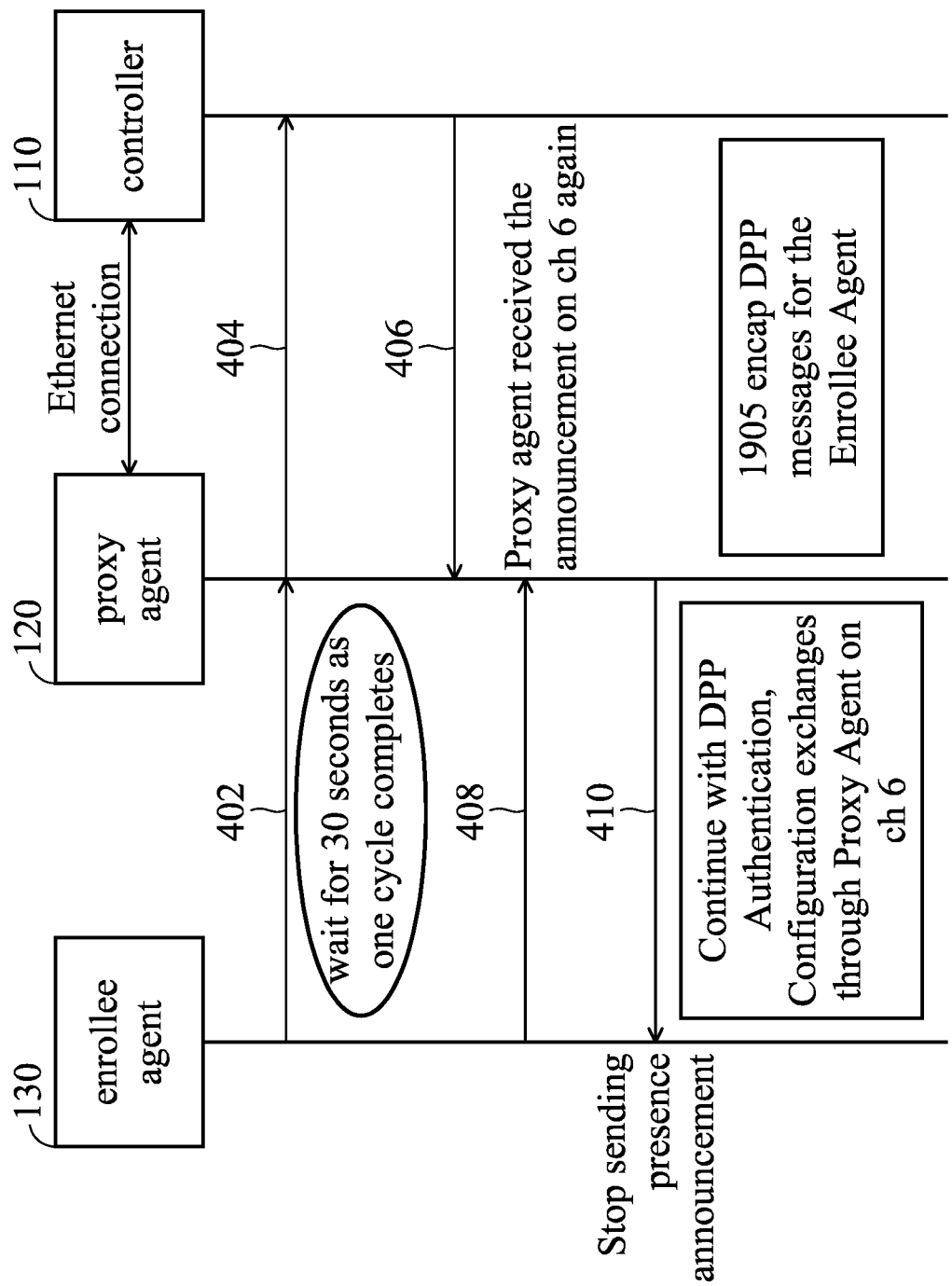
FIG. 4 is a flow diagram of the presence-announcement procedure of the enrollee agent in accordance with yet another embodiment of the present disclosure.

FIG. 4 is a flow diagram of the presence-announcement procedure of the enrollee agent in accordance with yet another embodiment of the present disclosure. Please refer to FIG. 1 and FIG. 4.

In an embodiment, the enrollee agent 130 collects information of channels on which CCE IE is found during the CCE scan process. Afterwards, the enrollee agent 130 determines whether CCE is found on any overlapping channels (i.e., adjacent channels), such as channels 5 and 6 described in Problem 1, and channels 6 and 7 described in Problem 2. If the enrollee agent 130 determines that CCE is found on overlapping channels, the enrollee agent sends chirp (i.e., presence announcement) only on one of the overlapping channels in the first iteration of the presence-announcement procedure, where each iteration includes 4 cycles (i.e., all channels in the channel list have been exhausted four times) as per the DPP specification. If the enrollee agent 130 has cycled through the presence-announcement procedure four times (i.e., 4 cycles passed) without receiving a valid DPP Authentication Request frame, the enrollee agent 130 will use another overlapping channel in the next iteration.

For example, assuming that the overlapping channels include a first channel and a second channel, the enrollee agent 130 may add the first channel into the channel list in the first iteration (i.e., each iteration includes 4 cycles), and the second channel is temporarily removed from the channel list in the first iteration. In the second iteration, the enrollee agent 130 removes the previous overlapping channel (i.e., first channel) in the first iteration from the channel list, and adds the unused overlapping channel (i.e., second channel) into the channel list. Then, the enrollee agent 1300 will repeat step 1 and step 2 again in the second iteration. It a valid authentication request is received and due to any reason that DPP Configuration or other step fail, the enrollee agent 130 again generates a new channel list excluding this overlapping channel (i.e., first channel) in the new channel list (i.e., for the second iteration).

As shown in FIG. 4, the controller 110 is connected to the proxy agent 120 through an Ethernet connection, and the proxy agent 120 and controller 110 are listening on channels 6 and 7, respectively. The enrollee agent 130 may perform CCE scan, and find that CCE are on channels 6 and 7. In this case, the enrollee agent 130 will add only channel 6 in its channel list for the first iteration of the presence-announcement procedure. For convenience of description, it is assumed that there is only channel 6 in the channel list for the first iteration.

When the enrollee agent 130 starts the first cycle of the first iteration in the presence-announcement procedure, the enrollee agent 130 sends a DPP Presence (Reconfiguration) Announcement frame to the proxy agent 120 on channel 6 (step 402). Upon receiving the DPP Announcement frame, the proxy agent 120 will encapsulate it in a 1905 chirp notification message, and send the 1905 chirp notification message to the controller 110 (step 404). When the controller 110 has received the DPP Announcement frame of the enrollee agent 130 through one of the proxy agents 120, the controller 110 constructs a DPP Authentication Request frame, encapsulates it in a proxied 1905 encap DPP message with a DPP chirp value TLV, and sends the proxied 1905 encap DPP message to the proxy agents 120 (step 406) so that it may be relayed to the enrollee agent 130.

If the enrollee agent 130 does not receive the DPP Authentication Request from the controller 110 or one of the proxy agents 120 within 2 seconds after sending the DPP Presence Announcement frame on channel 6, the enrollee agent 130 may determine that all channels in the channel list are exhausted, and the enrollee agent 130 waits for 30 seconds as one cycle completes. When the enrollee agent 130 starts the second cycle of the first iteration, the enrollee agent 130 sends the DPP Presence Announcement frame to the proxy agent 120 on channel 6 again (step 408). Thus, the proxy agent 120 will receive the DPP Presence Announcement frame from the enrollee agent 120 on channel 6 again. If the enrollee agent 130 receives the DPP Authentication Request frame within 2 seconds after sending the DPP Presence Announcement frame on channel (i.e., step 408), the enrollee agent 130 will stop the presence-announcement procedure. Thus, the enrollee agent 130 may continue with the DPP authentication exchange with the controller 110 through the proxy agent 120 on the channel (i.e., channel 6) of the proxy agent 120 from which it received the DPP Authentication (Reconfiguration) Request frame. After successful completion of these frame exchanges, a secure channel between the controller 110 and enrollee agent 130 is established.

If the enrollee agent 130 fails to receive a valid DPP Authentication Request frame within four cycles of the first iteration, the enrollee agent 130 removes the previous-used overlapping channel (i.e., channel 6) in the first iteration from the channel list, and adds the unused overlapping channel (i.e., channel 7) into the channel list for the second iteration. Then, the enrollee agent 1300 will repeat step 1 and step 2 again in the second iteration.

Specifically, the proposed method can be summarized in steps 1 to 4 as follows:

Step 1: Add non-overlapping channels in the channel list, and make sure to remove any previously tried overlapping channel in this iteration. It should be noted that the previously tried overlapping channel will be repeated only when all overlapping channels are tried once. For example, if channels 6 and 7 are respectively tried in the first iteration and the second iteration but the enrollee agent 130 fails to receive any valid DPP Authentication Request frame from the controller 110 or proxy agent 120, the enrollee agent 130 will add channel 6 (i.e., previously used in the first iteration) into the channel list for the third iteration.

Step 2: For each channel in the channel list generated, the Enrollee, shall send a DPP Presence Announcement frame and listen for 2 seconds to receive a DPP Authentication Request frame. If a valid DPP Authentication Request frame is not received, it shall repeat the presence announcement for the next channel in the channel list. It should be noted that if due to any reason that DPP Authentication or Reconfiguration fails, the flow goes to step 1 to generate a new channel list excluding the currently used overlapping channel in the new channel list.

Step 3: When all channels in the channel list have been exhausted, the Enrollee shall pause for at least 30 seconds before repeating the procedure in step 2 above.

Step 4: If the device has cycled through the procedure (Steps 2 & 3) four times without receipt of a valid DPP Authentication Request frame, the Enrollee may wait some amount of time before resuming the procedure. Prior to resuming the presence-announcement procedure, however, it shall generate a new channel list and repeat the procedure from Step 1.

Accordingly, Problem 2 as described above can be solved using the aforementioned method, which adds one or more non-overlapping channels in the channel list to make sure any previously tried overlapping channel is not used in this iteration.

Presence Announcement with Scanning Optimization in Wi-Fi 6E

IEEE 802.11ax, officially marketed by the Wi-Fi Alliance as Wi-Fi 6 (2.4 GHz and 5 GHz) and Wi-Fi 6E (6 GHz), is an IEEE standard for wireless local-area networks (WLANs) and the successor of 802.11ac. It is also known as High Efficiency Wi-Fi, for the overall improvements to Wi-Fi 6 clients under dense environments. It is designed to operate in license-exempt bands between 1 and 7.125 GHz, including the 2.4 and 5 GHz bands already in common use as well as the much wider 6 GHz band (5.925-7.125 GHz in the US).

As per the Sixth Generation (6G) wireless communication specification, there are two ways to scan, namely, out-of-band (OOB) discovery and in-band discovery. For example, out-of-band discovery refers to that the beacon/probe response from controller or proxy agent may include the Wi-Fi 6E channels in the RNR (Reduced Neighbor Report) IE TBTT (Target Beacon Transmission Time) information, and in-band discovery refers to scanning is performed on all 15 preferred scanning channels (PSCs) for 6G to find channels on which devices are sending CCE IE, and then these scanned channels having CCE IE are added to the channel list. In addition, while building the channel list, a conventional enrollee agent compatible with the Wi-Fi 6E standard still follows the procedure defined in the DPP specification, which are described in the present disclosure. This will result in higher overall DPP connection time due to the number of channels is increased using the Wi-Fi 6E standard.

Figure 5A:
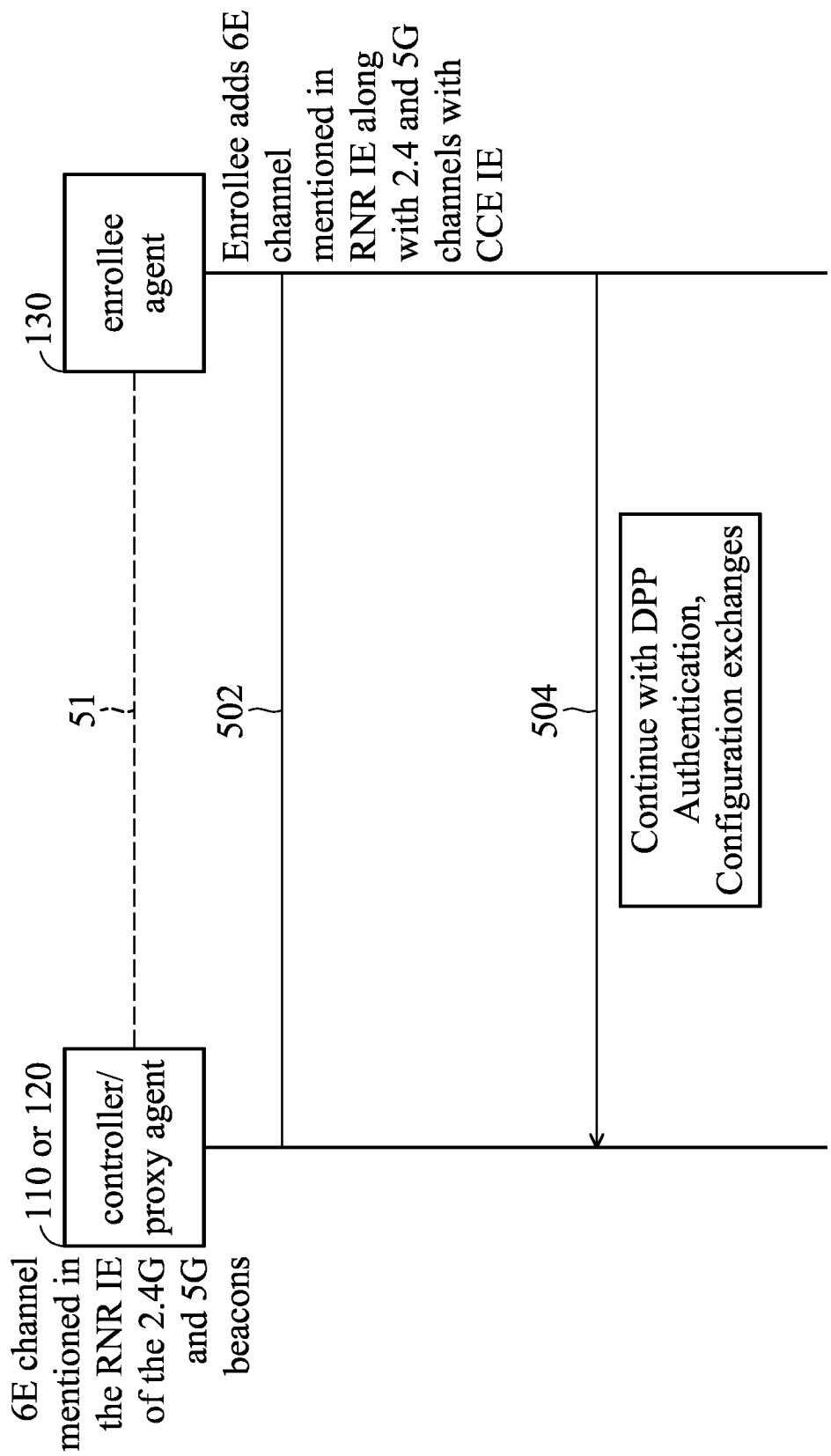
FIGS. 5A and 5B are flow diagrams of the first iteration and the second iteration of the scanning optimization process in the Wi-Fi 6E standard in accordance with an embodiment of the present disclosure.
Figure 5B:
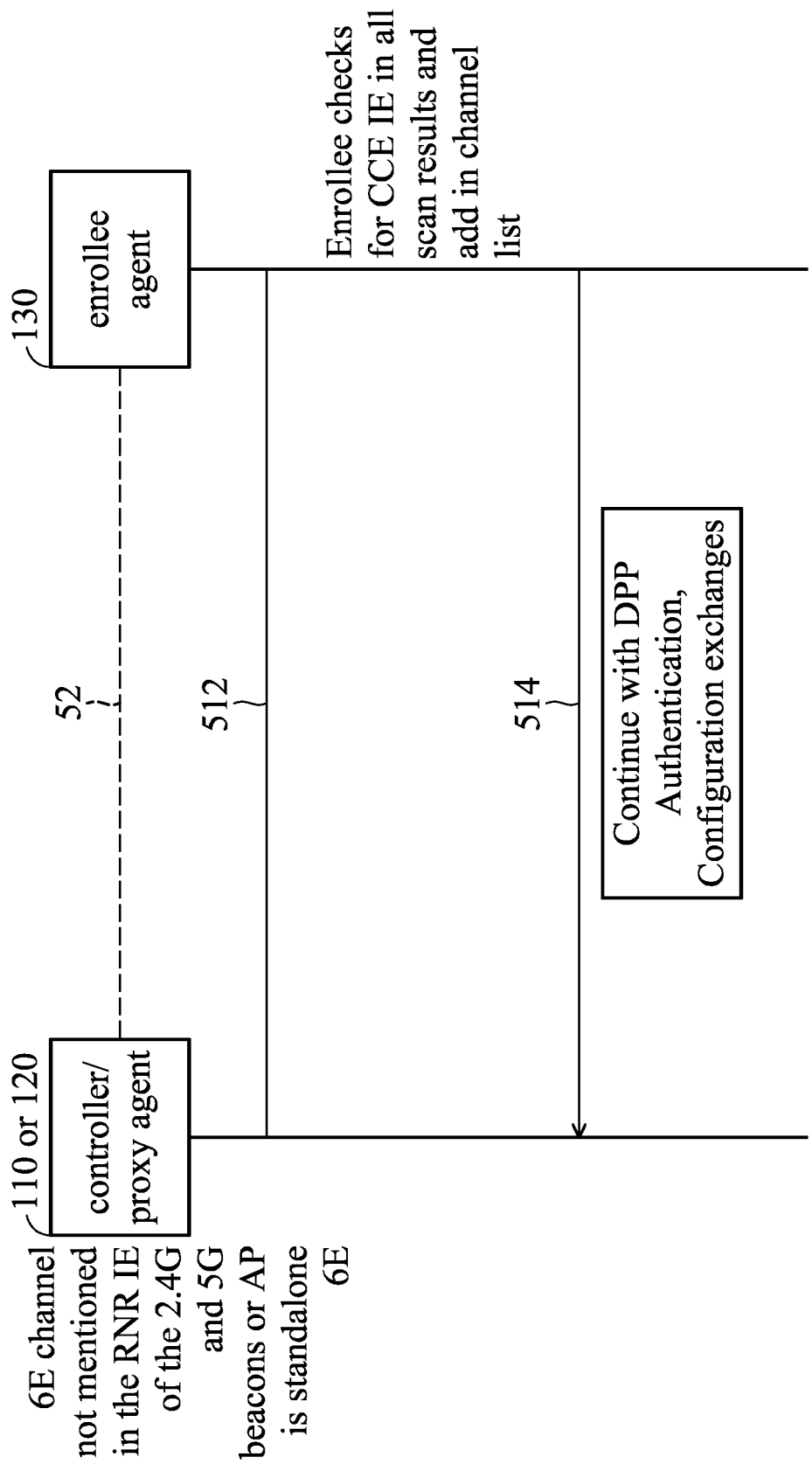

FIGS. 5A and 5B are flow diagrams of the first iteration and the second iteration of the scanning optimization process in the Wi-Fi 6E standard in accordance with an embodiment of the present disclosure. Please refer to FIG. 1 and FIGS. 5A-5B.

In an embodiment, the presence-announcement procedure with scanning optimization proposed in the present disclosure includes steps 1 to 4 as follows:

Step 1: Prepare a channel-6G channel list using out-of-band discovery or in-band discovery over 15 PSCs, where one of the out-of-band discovery and in-band discovery methods is used in each iteration in an alternate fashion. For example, if the out-of-band discovery method is used in the first iteration to build the channel list, the in-band discovery method is used in the second iteration to build the channel list, and so on.

Step 2: For each channel in the channel list generated, the Enrollee, shall send a DPP Presence Announcement frame and listen for 2 seconds to receive a DPP Authentication Request frame. If a valid DPP Authentication Request frame is not received, it shall repeat the presence announcement for the next channel in the channel list.

Step 3: When all channels in the channel list have been exhausted, the Enrollee shall pause for at least 30 seconds before repeating the procedure in Step 2 above.

Step 4: If the device has cycled through the procedure (Steps 2 & 3) four times without receipt of a valid DPP Authentication Request frame, then it shall generate a new channel list using the step 1 and follow the other steps again.

For example, as shown in FIG. 5A, the controller 110 or proxy agent 120 is connected to the enrollee agent 130 through a Wi-Fi link 51. In addition, the controller 110 or proxy agent 120 is capable of obtaining the Wi-Fi 6E channels in the RNR IE of the 2.4G and 5G beacons. Before building the channel list in the first cycle of the first iteration, the enrollee agent 130 may scan 2.4G and 5G channels to find these channels with CCE IE (step 502), and then add the channels with CCE IE into the channel list. In addition, the enrollee agent 130 can obtain the information about the Wi-Fi 6E channels in the RNR IE from the controller 110 or proxy agent 120 through the Wi-Fi link 51. The enrollee agent 130 may then add the Wi-Fi 6E channels in the RNR IE into the channel list along with 2.4G and 5G channels with CCE IE. Thus, the aforementioned procedure can help the enrollee agent 130 avoid scanning on all Wi-Fi 6E channels in the first iteration because in most time if an agent in the wireless network 100 sends CCE IE on 5G and 2.4G channels, it will also send CCE IE on Wi-Fi 6E channels as well.

Upon the channel list being built, the enrollee agent 130 sends a DPP Presence Announcement frame on one of the channels in the channel list (step 504). Once the enrollee agent 130 receives a valid DPP Authentication Request frame within four cycles of the first iteration, the enrollee agent 130 may continue with the DPP authentication exchange with the controller 110 through the proxy agent 120 on the channel of the proxy agent 120 from which it received the DPP Authentication (Reconfiguration) Request frame. After successful completion of these frame exchanges, a secure channel between the controller 110 and enrollee agent 130 is established.

As shown in FIG. 5B, the controller 110 or proxy agent 120 is connected to the enrollee agent 130 through a Wi-Fi link 52. In this scenario, the controller 110 or proxy agent 120 is incapable of obtaining the Wi-Fi 6E channels in the RNR IE of the 2.4G and 5G beacons, or the controller 110 or proxy agent 120 is a standalone Wi-Fi 6E AP. Before building the channel list in the second iteration, the enrollee agent 130 may scan 2.4G channels, 5G channels, and Wi-Fi 6E PSCs to find these channels with CCE IE (step 512), and then add the channels with CCE IE into the channel list. In other words, the enrollee agent 130 may perform a full scan on the 2.4G, 5G, and Wi-Fi 6E (6G) channels with CCE IE in this scenario. The enrollee agent 130 will perform 6G scanning on the Wi-Fi 6E PSCs which are not found in the RNR IE. If the Wi-Fi 6E PSCs are found in the RNR IE, the enrollee agent 130 will not scan these Wi-Fi 6E PSCs again in 6G scanning, but add these Wi-Fi 6E PSCs in the channel list along with new channels found in 6G scanning.

Upon the channel list being built, the enrollee agent 130 sends a DPP Presence Announcement frame on one of the channels in the channel list (step 514). Once the enrollee agent 130 receives a valid DPP Authentication Request frame within four cycles of the first iteration, the enrollee agent 130 may continue with the DPP authentication exchange with the controller 110 through the proxy agent 120 on the channel of the proxy agent 120 from which it received the DPP Authentication (Reconfiguration) Request frame. After successful completion of these frame exchanges, a secure channel between the controller 110 and enrollee agent 130 is established.

Specifically, the aforementioned embodiments in FIGS. 5A-5B may help improving connection in Wi-Fi 6E cases by attempting directly on Wi-Fi 6E channels found in the RNR of 2G and 5G channels in which CCE IE is found.

Figure 6:
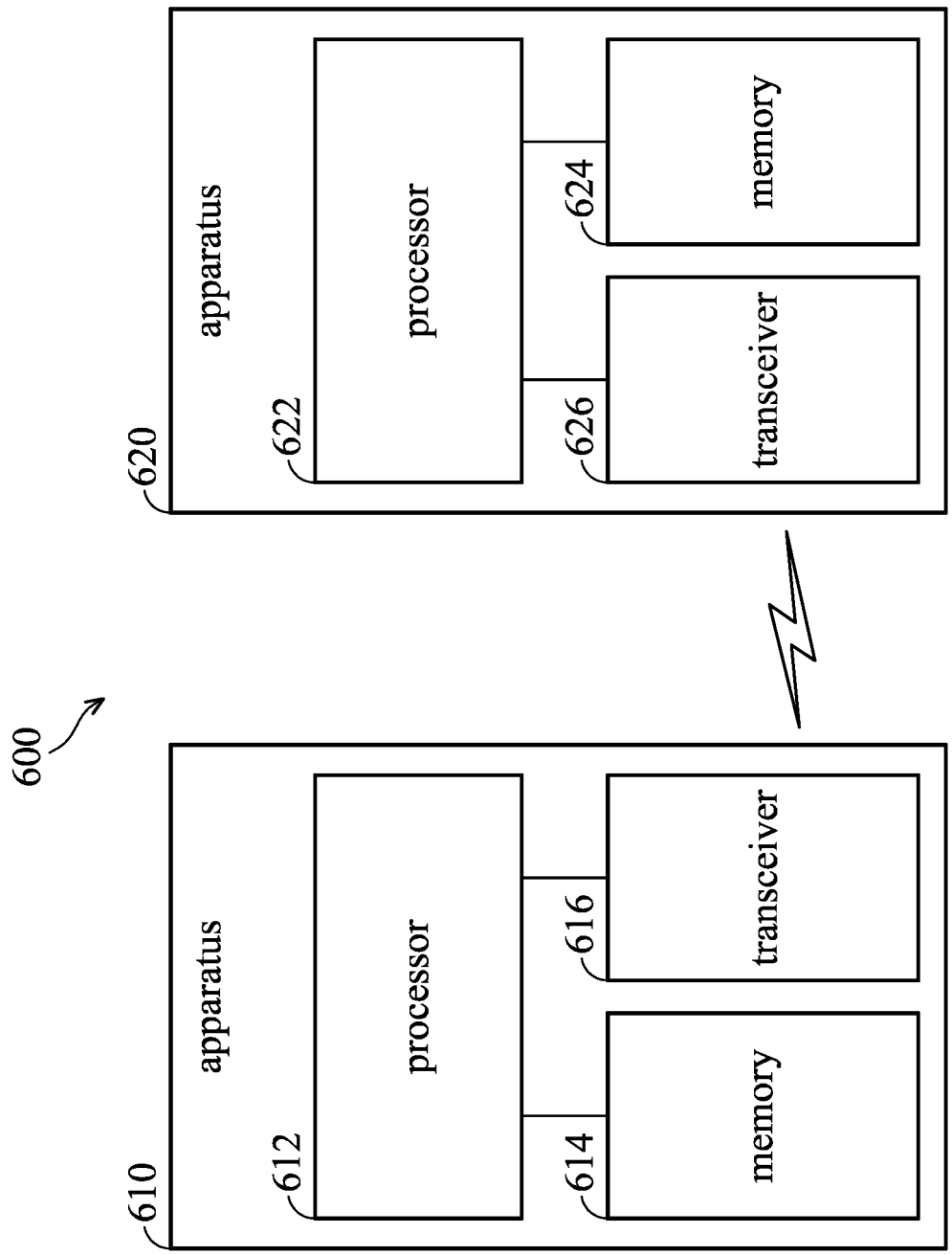
FIG. 6 is a block diagram of an example communication apparatus and an example network apparatus in accordance with an implementation of the present disclosure.

FIG. 6 is a block diagram of an example communication apparatus and an example network apparatus in accordance with an implementation of the present disclosure In FIG. 6, the communication environment 600 includes an example apparatus 610 and an example apparatus 620 in accordance with an implementation of the present disclosure. Each of apparatus 610 and apparatus 620 may perform various functions to implement schemes, techniques, processes and methods described herein pertaining to optimization for DPP onboarding in wireless networks, including various scheme described above in FIGS. 2 to 5.

Each of apparatus 610 and apparatus 620 may be a part of an electronic apparatus, which may be a portable or mobile apparatus, a wearable apparatus, a wireless communication apparatus or a computing apparatus. For instance, each of apparatus 610 and apparatus 620 may be implemented in an access point (AP), a repeater, a smartphone, a smartwatch, a personal digital assistant, a digital camera, or a computing equipment such as a tablet computer, a laptop computer or a notebook computer. Each of apparatus 610 and apparatus 620 may also be a part of a machine type apparatus, which may be an IoT or NB-IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. Alternatively, each of apparatus 610 and apparatus 620 may be implemented in the form of one or more integrated-circuit (IC) chips such as, for example and without limitation, one or more single-core processors, one or more multi-core processors, or one or more complex-instruction-set-computing (CISC) processors. Each of apparatus 610 and apparatus 620 may include at least some of those components shown in FIG. 6 such as a processor 612 and a processor 622, respectively. Each of apparatus 610 and apparatus 620 may further include one or more other components not pertinent to the proposed scheme of the present disclosure (e.g., internal power supply, display device and/or user interface device), and, thus, such component(s) of each of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including implementation of optimization for DPP onboarding in wireless networks in accordance with various implementations of the present disclosure.

In some implementations, apparatus 610 may also include a transceiver 616 as a communication device coupled to processor 612 and configured to wirelessly transmit and receive data. In some implementations, apparatus 610 may further include a memory 614 coupled to processor 612 and capable of being accessed by processor 612 and storing data therein. In some implementations, apparatus 620 may also include a transceiver 626 as a communication device coupled to processor 622 and configured to wirelessly transmit and receive data. In some implementations, apparatus 620 may further include a memory 624 coupled to processor 622 and capable of being accessed by processor 622 and storing data therein. Accordingly, apparatus 610 and apparatus 620 may wirelessly communicate with each other via transceiver 616 and transceiver 626, respectively.

To aid better understanding, the following description of the operations, functionalities and capabilities of each of apparatus 610 and apparatus 620 is provided in the context of apparatus 610 acting as a controller (e.g., controller 110) and apparatus 620 acting as an proxy agent (e.g., proxy agent 120) of a wireless network (e.g., wireless network 100).

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any device that can contain, store, communicate, propagate, or transport the program for use by or in connection with the instruction execution system, device, or device.

The medium may be an electronic, magnetic, optical, electromagnetic, infrared, semiconductor system (or device or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus, comprising:
a communication device; and
a processor, coupled to the communication device and configured to perform operations comprising:
scanning wireless channels supported by the device on which a wireless device is advertising a specific information element (IE) via the communication device;
adding the scanned wireless channels with the specific information element to a channel list;
starting a presence-announcement procedure by sending a first presence-announcement frame on a first wireless channel of the scanned wireless channels in the channel list in response to the apparatus onboarding to a wireless network which comprises a controller and one or more proxy agents; and
stopping the presence-announcement procedure upon receipt of a valid authentication request frame from the controller or one of the proxy agents within a predetermined time after sending the presence-announcement frame.

2. The apparatus as claimed in claim 1, wherein the specific information element refers to CCE (Configurator Connectivity Element) IE.

3. The apparatus as claimed in claim 1, wherein the wireless device is an access point.

4. The apparatus as claimed in claim 2, wherein the processor is further configured to send a second presence-announcement frame on a second wireless channel of the scanned wireless channels in the channel list in response to the processor failing to receive the valid authentication request from the controller or one of the proxy agents within the predetermined time after sending the first presence-announcement frame.

5. The apparatus as claimed in claim 1, wherein the scanned wireless channels with the specific information element include a third wireless channel and a fourth wireless channel, which are overlapping wireless channels, and the processor is further configured to add the third wireless channel to the channel list and exclude the fourth wireless channel from the channel list in a first iteration of the presence-announcement procedure.

6. The apparatus as claimed in claim 5, wherein in response to the processor failing to receive a valid authentication request frame from the controller or one of the proxy agents in four cycles of the first iteration, the processor is further configured to update the channel list by removing the third wireless channel from the channel list and adding the fourth wireless channel in the channel list in a second iteration of the presence-announcement procedure, and start the second iteration using the updated channel list.

7. The apparatus as claimed in claim 1, wherein the processor is further configured to determine the scanned wireless channels in the channel list for a first iteration of the presence-announcement procedure using one of an out-of-band discovery technique and an in-band discovery technique.

8. The apparatus as claimed in claim 7, wherein in response to the processor failing to receive a valid authentication request frame from the controller or one of the proxy agents in four cycles of the first iteration, the processor is further configured to update the channel list for a second iteration of the presence-announcement procedure using the other of the out-of-band discovery technique and the in-band discovery technique.

9. The apparatus as claimed in claim 7, wherein when the out-of-band discovery technique is used, the processor obtains information about Wi-Fi 6E channels from an RNR IE (Reduced Neighbor Report Information Element) of 2.4G and 5G beacons, and scans on 2.4G and 5G channels to build the channel list,
wherein when the in-band discovery technique is used, the processor scans on Wi-Fi 6E preferred scanning channels which are not found in the RNR IE to build the channel list.

10. A method, comprising:
scanning, by a processor of an apparatus, wireless channels supported by an apparatus device on which a wireless device is advertising a specific information element (IE) via a communication device;
adding, by the processor, the scanned wireless channels with the specific information element to a channel list;
starting, by the processor, a presence announcement procedure by sending a first presence-announcement frame on a first scanned wireless channel in the channel list in response to the apparatus onboarding to a wireless network which comprises a controller and one or more proxy agents; and
stopping the presence-announcement procedure upon receipt of a valid authentication request frame from the controller or one of the proxy agents within a predetermined time after sending the presence-announcement frame.

11. The method as claimed in claim 10, wherein the specific information element refers to CCE (Configurator Connectivity Element) IE.

12. The method as claimed in claim 10, wherein the wireless device is an access point.

13. The method as claimed in claim 12, further comprising:
sending, by the processor, a second presence-announcement frame on a second wireless channel of the scanned wireless channels in the channel list in response to the processor failing to receive the valid authentication request from the controller or one of the proxy agents within the predetermined time after sending the first presence-announcement frame.

14. The method as claimed in claim 10, wherein the scanned wireless channels with the specific information element include a third wireless channel and a fourth wireless channel, which are overlapping wireless channels, and the method further comprises: adding the third wireless channel to the channel list and excluding the fourth wireless channel from the channel list in a first iteration of the presence-announcement procedure.

15. The method as claimed in claim 14, further comprising:
in response to the processor failing to receive a valid authentication request frame from the controller or one of the proxy agents in four cycles of the first iteration, updating the channel list by removing the third wireless channel from the channel list and adding the fourth wireless channel in the channel list in a second iteration of the presence-announcement procedure, and start the second iteration using the updated channel list.

16. The method as claimed in claim 10, further comprising:
determining the scanned wireless channels in the channel list for a first iteration of the presence-announcement procedure using one of an out-of-band discovery technique and an in-band discovery technique.

17. The method as claimed in claim 16, further comprising:
in response to the processor failing to receive a valid authentication request frame from the controller or one of the proxy agents in four cycles of the first iteration, updating the channel list for a second iteration of the presence-announcement procedure using the other of the out-of-band discovery technique and the in-band discovery technique.

18. The method as claimed in claim 16, further comprising:
when the out-of-band discovery technique is used, obtaining information about Wi-Fi 6E channels from an RNR IE (Reduced Neighbor Report Information Element) of 2.4G and 5G beacons, and scans on 2.4G and 5G channels to build the channel list; and
wherein when the in-band discovery technique is used, scanning on Wi-Fi 6E preferred scanning channels which are not found in the RNR IE to build the channel list.

19. An apparatus, comprising:
a communication device; and
a processor, coupled to the communication device and configured to perform operations comprising:
scanning wireless channels supported by the device on which a wireless device is advertising a specific information element (IE) via the communication device using one of an out-of-band discovery technique and an in-band discovery technique;
adding the scanned wireless channels with the specific information element to a channel list;
starting a first iteration of a presence-announcement procedure using the scanned wireless channels in the channel list for the first iteration in response to the apparatus onboarding to a wireless network which comprises a controller and one or more proxy agents; and
starting a second iteration of the presence-announcement procedure using the scanned wireless channels in the channel list, which is updated using the other of the out-of-band discovery technique and the in-band discovery technique, in response to the processor fails to receive a valid authentication request frame in four cycles of the first iteration.

20. The apparatus as claimed in claim 19, wherein the apparatus supports the Wi-Fi 6E standard.

* * * * *